US008098893B2

(12) United States Patent
Nakamura et al.

(10) Patent No.: US 8,098,893 B2
(45) Date of Patent: Jan. 17, 2012

(54) MOVING OBJECT IMAGE TRACKING APPARATUS AND METHOD

(75) Inventors: Hiroaki Nakamura, Kawasaki (JP); Tadashi Kuroiwa, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 361 days.

(21) Appl. No.: 12/550,648

(22) Filed: Aug. 31, 2009

(65) Prior Publication Data

US 2010/0246886 A1    Sep. 30, 2010

(30) Foreign Application Priority Data

Mar. 26, 2009    (JP) .................................. 2009-076700

(51) Int. Cl.
*G06K 9/00*    (2006.01)
(52) U.S. Cl. ........................................ 382/103; 382/104
(58) Field of Classification Search .................. 382/100, 382/103, 104, 107, 260–261; 345/179–181; 340/540, 933–937; 348/61, 103, 116, 139, 348/142, 152–153, 169; 701/1, 4, 200, 300
See application file for complete search history.

(56) References Cited

U.S. PATENT DOCUMENTS

| 7,489,806 | B2 * | 2/2009 | Mohri et al. ................. | 382/107 |
| 7,965,868 | B2 * | 6/2011 | Roberts et al. ................ | 382/103 |
| 8,009,918 | B2 * | 8/2011 | Van Droogenbroeck et al. ............................ | 382/224 |
| 2001/0055063 | A1 * | 12/2001 | Nagai et al. ................... | 348/116 |
| 2009/0115850 | A1 | 5/2009 | Nakamura ..................... | 348/169 |
| 2009/0262197 | A1 | 10/2009 | Nakamura ..................... | 348/169 |

FOREIGN PATENT DOCUMENTS

| JP | 5-259722 | 10/1993 |
| JP | 2006-106910 A | 4/2006 |
| JP | 2009-141728 | 6/2009 |

OTHER PUBLICATIONS

U.S. Appl. No. 12/549,448.

* cited by examiner

*Primary Examiner* — Samir Ahmed
*Assistant Examiner* — Mehdi Rashidian
(74) *Attorney, Agent, or Firm* — Ohlandt, Greeley, Ruggiero & Perle, L.L.P.

(57) ABSTRACT

An apparatus includes a first-computation unit computing first-angular-velocity-instruction values for driving first-and-second-rotation units to track a moving object, using a detected tracking error and a detected angles, when the moving object exists in a first range separate from a zenith by at least a preset distance, a second-computation unit computing second-angular-velocity-instruction values for driving the first-and-second-rotation units to track the moving object and avoid a zenith-singular point, using the detected angles, the detected tracking error and an estimated traveling direction, and a control unit controlling the first-and-second-rotation units to eliminate differences between the first-angular-velocity-instruction values and the angular velocities when the moving object exists in the first range, and controlling the first-and-second-rotation units to eliminate differences between the second-angular-velocity instruction values and the angular velocities when the moving object exists in a second range within the preset distance from the zenith.

7 Claims, 9 Drawing Sheets

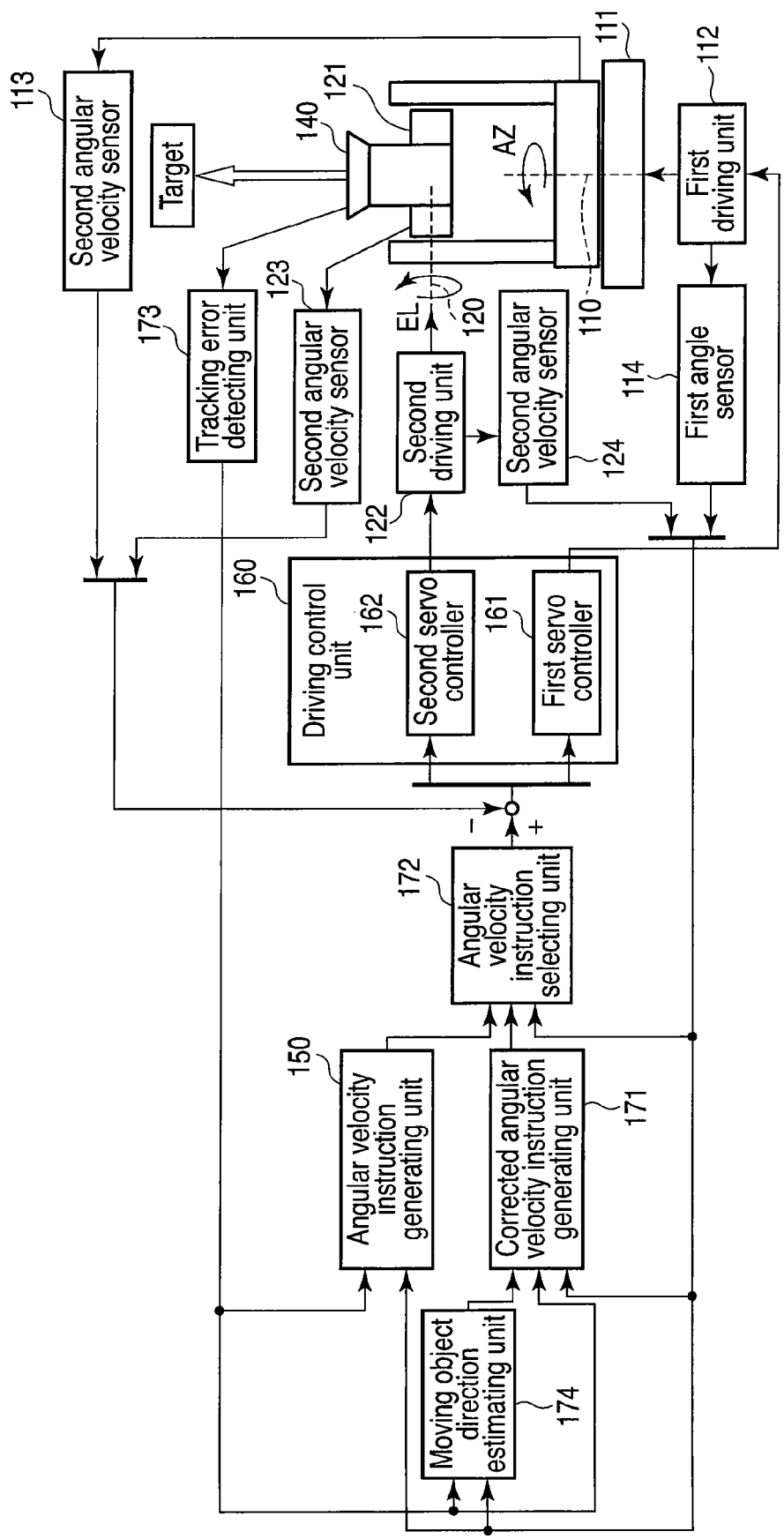
F I G. 1

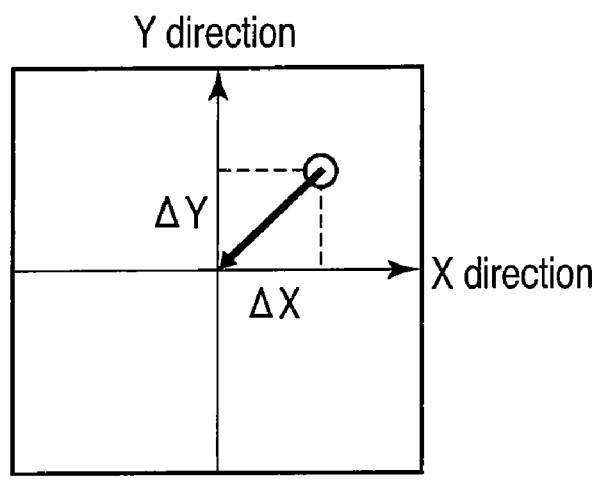
F I G. 4
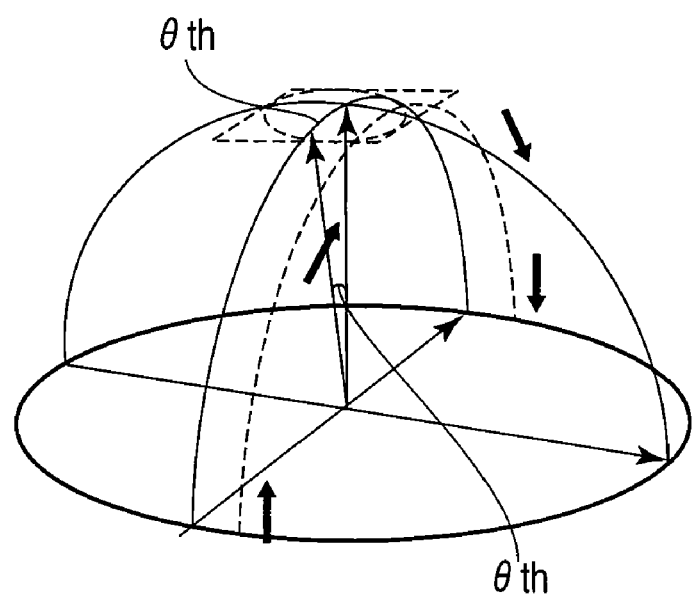
F I G. 5

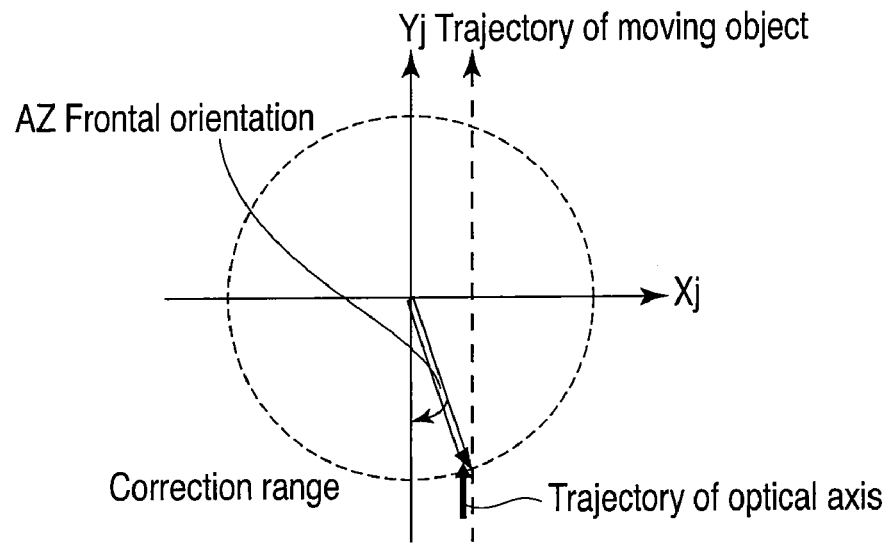
F I G. 6
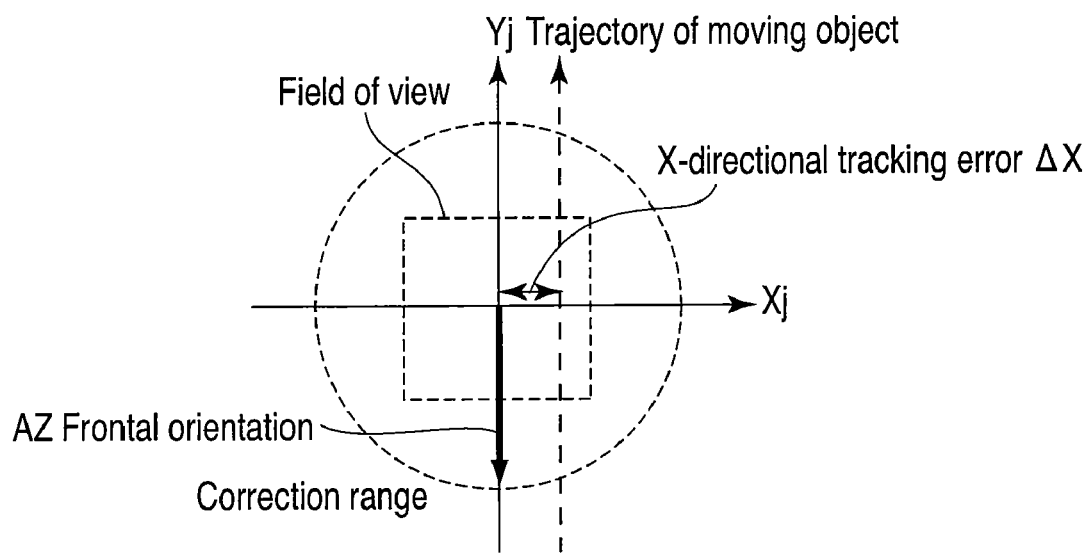
F I G. 7

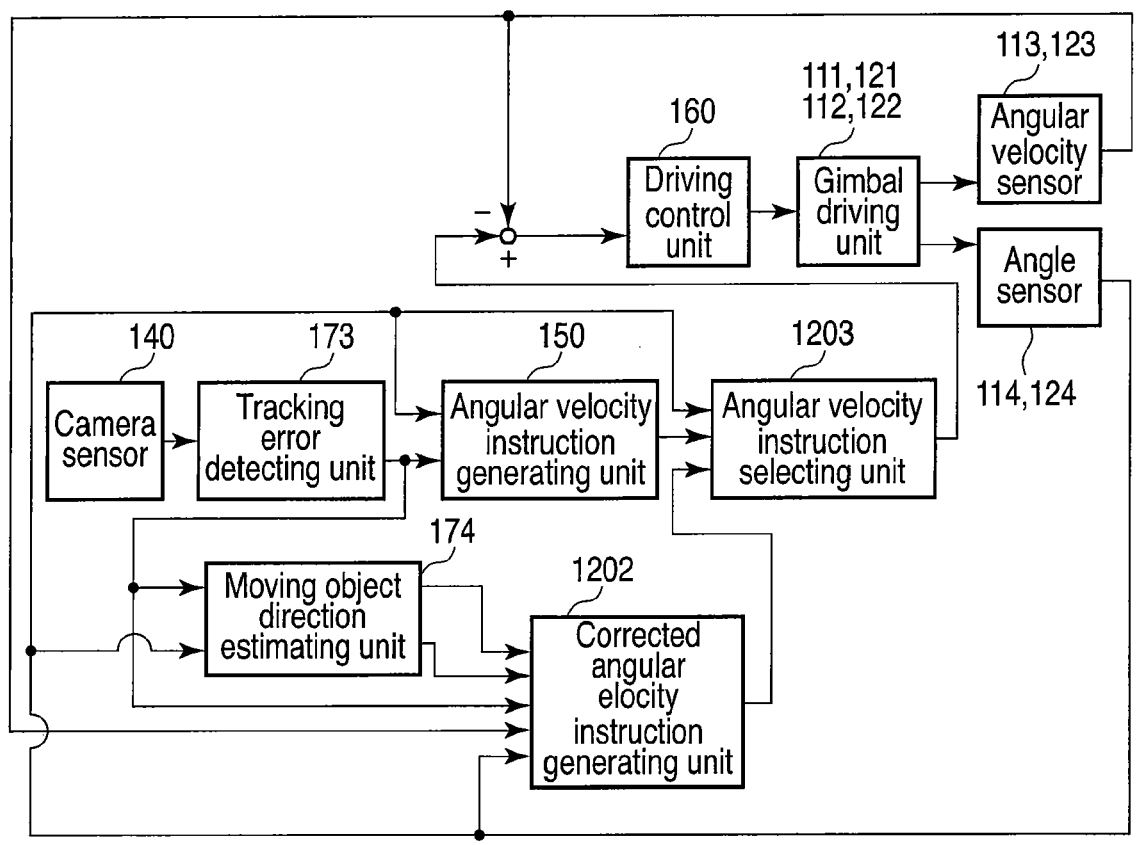
F I G. 14

MOVING OBJECT IMAGE TRACKING APPARATUS AND METHOD

CROSS-REFERENCE TO RELATED APPLICATIONS

This application is based upon and claims the benefit of priority from prior Japanese Patent Application No. 2009-076700, filed Mar. 26, 2009, the entire contents of which are incorporated herein by reference.

BACKGROUND OF THE INVENTION

1. Field of the Invention

The present invention relates to a moving object image tracking apparatus and method for enabling a target recognition sensor, such as a camera, to track a target that can move in every direction.

2. Description of the Related Art

In recent years, systems for tracking an object using, for example, an ITV camera, to realize continued monitoring or acquire detailed information have been produced on a commercial basis for protective service equipment employed in major facilities such as airports and manufacturing plants, lifeline facilities such as electric power plants and water networks, and traffic information support systems such as ITSs. These systems include not only ground equipment type systems, but also compact ones installed in vehicles, ships or airplanes and having a vibration-proof structure. In the systems, it has come to be important to enhance their whirling speed to make them quickly point a plurality of targets and sequentially track the targets.

In the above moving object image tracking systems, the gimbal structure must have at least two axes to track a target that moves in every direction. In a biaxial gimbal, when the target passes the zenith or near the same, the AZ axis of the gimbal must instantly rotate through 180°. Actually, however, this motion is hard to realize, resulting in a gimbal lock phenomenon in which continuous tracking is impossible. Accordingly, the biaxial gimbal structure cannot be oriented to the zenith, which makes it difficult to realize omnidirectional tracking.

In the conventional moving object image tracking systems, the degree of freedom is increased using a triaxial gimbal structure, and one operation is distributed to the AZ axis and the xEL axis to prevent the angular velocity of the gimbal from excessively increasing, whereby the movable range of the gimbal is not exceeded to avoid the gimbal lock phenomenon and enable continuous omnidirectional tracking (see, for example, JP-A 2006-106910 (KOKAI)).

The above-described triaxial gimbal structure is more complex than the biaxial gimbal structure, and is hard to reduce in size and cost since it requires a larger number of driving means, such as motors. Further, since a camera, for example, is mounted on the gimbal structure, the load inertia of the xEL axis is large, which may cause axial interference between the AZ axis and the xEL axis. This is a problem peculiar to the triaxial gimbal structure.

Further, to execute tracking near the zenith using the biaxial gimbal structure, a motor performance that allows instant 180° rotation is required, for example. Thus, excessive requests must be satisfied.

The present invention has been developed in light of the above, and provides a moving object image tracking apparatus that exhibits improved tracking performance without any additional sensor, and a method employed therein.

BRIEF SUMMARY OF THE INVENTION

According to an aspect of the invention, there is provided a moving object image tracking apparatus comprising: a first rotation unit configured to rotate about an azimuth axis vertically oriented and rotatably supported; a second rotation unit configured to rotate about an elevation axis rotatably supported and horizontally oriented, the elevation axis being perpendicular to the azimuth axis, the second rotation unit being horizontally rotatable from a front position at which the second rotation unit faces a front, to a back position at which the second rotation unit faces a back, via an angular position corresponding to a zenith, the second rotation unit having a movable range of at least 180'; a driving unit configured to drive the first rotation unit and the second rotation unit to rotate independent of each other; an acquisition unit supported by the second rotation unit and configured to acquire image data of a moving object by photography; a first detection unit configured to detect, in the image data, a tracking error indicating a deviation of the moving object from a center of a field of view of the acquisition unit; a second detection unit configured to detect angles indicating attitudes of the first rotation unit and the second rotation unit; a third detection unit configured to detect angular velocities of the first rotation unit and the second rotation unit; a first computation unit configured to compute first angular velocity instruction values for driving the first rotation unit and the second rotation unit to track the moving object, using the detected tracking error and the detected angles, when the moving object exists in a first range separate from the zenith by at least a preset distance; an estimation unit configured to estimate a traveling direction of the moving object using the detected angles and the detected tracking error, when the moving object exists in a second range within the preset distance from the zenith; a second computation unit configured to compute second angular velocity instruction values for driving the first rotation unit and the second rotation unit to track the moving object and avoid a zenith singular point, using the detected angles, the detected tracking error and the estimated traveling direction; and a control unit configured to control the driving unit to eliminate differences between the first angular velocity instruction values and the angular velocities when the moving object exists in the first range, and to control the driving unit to eliminate differences between the second angular velocity instruction values and the angular velocities when the moving object exists in the second range.

BRIEF DESCRIPTION OF THE SEVERAL VIEWS OF THE DRAWING

FIG. 1 is a block diagram illustrating a moving object image tracking apparatus according to a first embodiment;

FIG. 4 is a schematic view illustrating the field of view of the camera sensor shown in FIG. 1, and moving object tracking;

FIG. 5 is a view illustrating the trajectory of a moving object, and that of the optical axis of an optical system;

FIG. 6 is a view illustrating the trajectories, correction range and tracking error, using a gimbal zenith coordinate system;

FIG. 7 is a view illustrating the trajectories, correction range and tracking error obtained after the zenith is reached, using the gimbal zenith coordinate system;

FIG. 14 is a block diagram illustrating a correction control system according to a third embodiment.

DETAILED DESCRIPTION OF THE INVENTION

Figure 2:
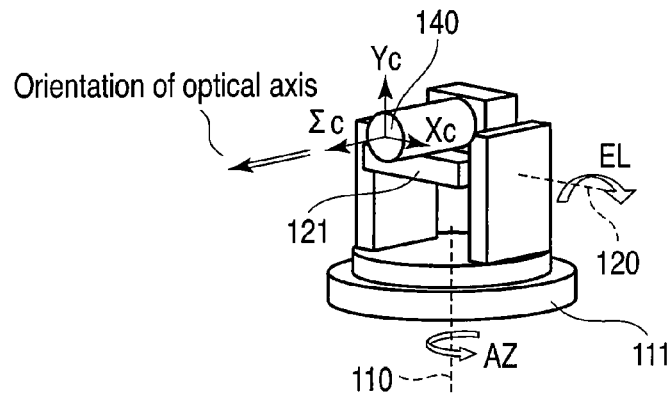
FIG. 2 is a perspective view illustrating the gimbal driving unit shown in FIG. 1.

Moving object image tracking apparatuses and methods according to embodiments will be described in detail with reference to the accompanying drawings. In the embodiments, like reference numbers denote like elements, and duplicate of description will be avoided.

The moving object image tracking apparatuses of the embodiments are obtained by applying a control system for a moving object image tracking mechanism to an image tracking system.

First Embodiment

Referring first to FIG. 1, a moving object image tracking apparatus according to a first embodiment will be described.

The moving object image tracking apparatus of the first embodiment includes first and second gimbals 111 and 121, first and second driving units 112 and 122, first and second angular velocity sensors 113 and 123, first and second angle sensors 114 and 124, a camera sensor 140, a tracking error detecting unit 173, an angular velocity instruction generating unit 150, a moving object direction estimating unit 174, a corrected angular velocity instruction generating unit 171, an angular velocity instruction selecting unit 172, and a driving control unit 160. The driving control unit 160 includes first and second servo controllers 161 and 162.

The first gimbal 111 rotates about a first gimbal axis 110 as a rotatably supported vertical azimuth axis. The second gimbal 121 rotates about a second gimbal axis 120 that is perpendicular to the first gimbal axis 110 and serves as a rotatably supported elevation axis. The first and second driving units 112 and 122 rotate the first and second gimbals 111 and 121, respectively.

The first angular velocity sensor 113 detects the angular velocity of the first gimbal 111 that rotates about the first gimbal axis 110. The second angular velocity sensor 123 detects the angular velocity of the second gimbal 121 that rotates about the second gimbal axis 120.

The first angle sensor 114 detects the angle of rotation of the first gimbal 111 with respect to a gimbal fixing unit (not shown). The second angle sensor 124 detects the angle of rotation of the second gimbal 121 with respect to the first gimbal 111. The camera sensor 140 is supported by the second gimbal 121 and used to detect a moving object and produce image data thereof.

The tracking error detecting unit 173 performs image processing on image data obtained from the camera sensor 140 to detect a tracking error. In general, the tracking error detecting unit 173 executes binarization to obtain monochrome image data, extracts the characterizing point of the moving object to determine the position thereof in the field of view of the camera, and detects, as the detected tracking error, a two-dimensional displacement ($\Delta X$, $\Delta Y$) from the center of the field of view. The time required for the above process including image processing is regarded as a sampling time for detecting a tracking error. The detected tracking error will be described later with reference to FIG. 4.

The angular velocity instruction generating unit 150 generates angular velocity instruction values for driving the gimbals to track a moving object, based on the detected two-dimensional tracking error from the tracking error detecting unit 173, and the angles ($\theta_1$, $\theta_2$) of the two axes, which indicate the attitudes of the gimbals and are detected by the first and second angle sensors 114 and 124. This process will be described later in detail with reference to FIG. 3.

The moving object direction estimating unit 174 receives data on the detected two-dimensional tracking error from the tracking error detecting unit 173, and receives data on the detected angles from the first and second angle sensors 114 and 124, thereby acquiring data on the traveling direction of the moving object as an estimated moving object direction value (estimated angle).

The corrected angular velocity instruction generating unit 171 receives data on the estimated moving object direction value, the detected two-dimensional tracking error and the detected angles from the moving object direction estimating unit 174, the tracking error detecting unit 173 and the first and second angle sensors 114 and 124, respectively, and generates corrected angular velocity instruction values for driving the gimbals to track the moving objet with the zenith avoided.

The angular velocity instruction selecting unit 172 receives the angular velocity instruction values, the corrected angular velocity instruction values, and the detected angles from the angular velocity instruction generating unit 150, the corrected angular velocity instruction generating unit 171 and the angle sensors 114 and 124, respectively, and outputs either the angular velocity instruction values received from the angular velocity instruction generating unit 150, or the corrected angular velocity instruction values received from the corrected angular velocity instruction generating unit 171, in accordance with the degree of closeness in the orientation of the optical axis to the zenith.

The driving control unit 160 computes control values for making zero the difference between each of the angular velocity instruction values for the first and second angular velocity sensors 113 and 123, and the corresponding one of the angular velocities detected by the first and second angular velocity sensors 113 and 123. The first and second servo controllers 161 and 162 correspond to the first and second angular velocity sensors 113 and 123, respectively, and output control values to the first, and second driving units 112 and 122, respectively.

Referring then to FIG. 2, the gimbal driving unit used in the first embodiment will be described.

The first gimbal axis of the gimbal driving unit is an azimuth axis (hereinafter, referred to simply as the "AZ axis"), and the second gimbal is an elevation axis (hereinafter, referred to simply as the "EL axis"). The moving object image tracking apparatus of FIG. 1 is a biaxial whirling apparatus having a biaxial structure in which the AZ axis and the EL axis intersect each other at a point.

Figure 3:
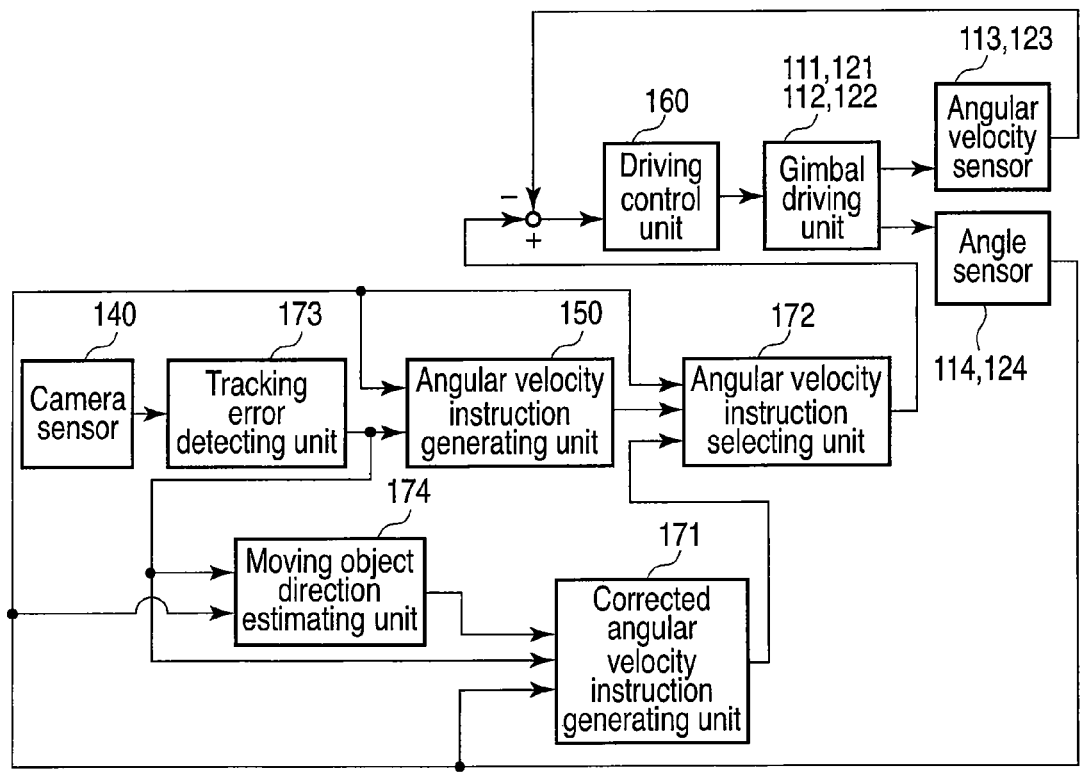
FIG. 3 is a block diagram illustrating the correction control system shown in FIG. 1.

Referring to FIG. 3, a description will be given of a correction control system incorporated in the moving object image tracking apparatus of the embodiment. FIG. 3 is a block diagram collectively illustrating the AZ axis and the EL axis.

The angular velocity instruction generating unit 150 generates angular velocity instruction values given by the following expression (A) and used for driving the gimbals to track a moving object, based on the corrected two-dimensional tracking error obtained from the tracking error detecting unit 173, and the angles ($\theta_1$, $\theta_2$) of the two axes, which indicate the attitudes of the gimbals and are detected by the first and second angle sensors 114 and 124, respectively.

$$\dot{\theta}r1, \dot{\theta}r2 \tag{A}$$

The angular velocities set for the respective gimbal axes based on the two-dimensional image data ($\Delta X$, $\Delta Y$) can be expressed by the following relational expression for computing an angular velocity instruction value from a detected tracking error and detected angles:

$$\begin{bmatrix} \dot{\theta}r1 \\ \dot{\theta}r2 \end{bmatrix} = K_C \begin{bmatrix} -\sec\theta_2 & 0 \\ 0 & 1 \end{bmatrix} \begin{bmatrix} \Delta X \\ \Delta Y \end{bmatrix} \tag{1}$$

where $K_c$ is a tracking gain, and sec θ is a secant function related to θ (this function reaches an infinite value when θ is 90°). Accordingly, at or near the zenith, an extremely high angular velocity instruction will be output to the first gimbal 111, which involves a gimbal lock problem.

In the correction control performed in the first embodiment, the moving object direction estimating unit 174 estimates the traveling direction of the moving object, based on angle data indicating the angles of the gimbals, and data indicating the detected tracking error and sent from the camera sensor 140. In the zenith correction range to which zenith correction is applied, the optical axis of the camera sensor determined by the angles of the gimbals is oriented toward the zenith, and the position of the moving object can be estimated from the optical axis and the tracking error. In the gimbal zenith coordinate system in which 0° and 90° are set as reference values for the first and second gimbals, respectively, the position component ($X_j$, $Y_j$) of the moving object associated with the optical axis is expressed using the transform, given by the following equations, of the coordinate system from the spherical coordinate system to the Cartesian coordinate system:

$$X_j[n]=\cos\theta_2[n]\cdot\cos(\theta_1[n]-\pi/2)$$

$$Y_j[n]=\cos\theta_2[n]\cdot\sin(\theta_1[n]-\pi/2) \tag{2}$$

Whenever the zenith correction is applied, a tracking error occurs. Therefore, it is necessary to correct a position component based on the tracking error, using the position of the optical axis. The camera coordinate system secured to the camera is rotated by the first gimbal 111, and hence the position component ($X_e$, $Y_e$) due to the tracking error is given by the following equation that expresses the inverse rotation transform of the angle of the first gimbal:

$$\begin{bmatrix} X_e[n] \\ Y_e[n] \end{bmatrix} = \begin{bmatrix} \cos(-\theta_1[n]) & -\sin(-\theta_1[n]) \\ \sin(-\theta_1[n]) & \cos(-\theta_1[n]) \end{bmatrix} \begin{bmatrix} \Delta X \\ \Delta Y \end{bmatrix} \tag{3}$$

Accordingly, the position (X,Y) of the moving object in the gimbal zenith coordinate system is given by the following equations:

$$X[n]=X_j[n]-X_e[n]$$

$$Y[n]=Y_j[n]+Y_e[n] \tag{4}$$

Based on the thus-estimated position (X, Y) of the moving object, the difference (dx, dy) of a k-sampling interval between a sample (n−k) and a subsequent sample (n) is given by $$dx=X[n]-X[n-k]$$

$$dy=Y[n]-Y[n-k] \tag{5}$$

Based on the thus-determined difference in moving object estimated position, the traveling direction (angle) $\theta_{est}$ of the moving object is given by $$\theta_{est}=\arctan(dy/dx) \tag{6}$$

The corrected angular velocity instruction generating unit 171 generates a corrected angular velocity instruction, using the thus-estimated moving object traveling angle $\theta_{est}$, as well as the gimbal angles ($\theta_1$, $\theta_2$) and the tracking error ($\Delta X$, $\Delta Y$).

Within the correction range in which the corrected angular velocity instruction is applied, the optical axis is oriented toward the zenith. Therefore, the correction range is given by the following mathematical expression that is related to a correction range threshold angle $\theta_{th}$ and utilizes transformation of a spherical coordinate system based on the gimbal angles into a Cartesian coordinate system:

$$|(\cos\theta_2\cdot\cos\theta_1)^2+(\cos\theta_2\cdot\sin\theta_1)^2|<(\sin\theta_{th})^2$$

Namely, $|(\cos\theta_2)^2|<(\sin\theta_{th})^2$ (7)

When the optical axis is within the correction range, correction driving for driving the optical axis to pass through the zenith is executed within an allowable tracking error range, in order to avoid gimbal lock in which an excessive angular velocity instruction is generated because of a tracking error near the zenith.

Assume that when the EL axis is at 0°, the camera faces the front and the AZ axis is at 0°. This position will hereinafter be referred to as "the front position." Similarly, assume that when the EL axis is at 180°, the camera faces the back and the AZ axis is at 180°. This position will hereinafter be referred to as "the back position." When the moving object is at the zenith, the traveling direction of the moving object is opposite to the orientation in which the front position is assumed. Accordingly, a corrected AZ-axis angle $\theta_{need}$ is computed based on the angle $\theta_1$ of the AZ axis and the estimated moving object traveling angle $\theta_{est}$, using the following equation:

$$\theta_{need}=\theta_{est}-\pi/2-\theta_1 \tag{8}$$

A corrected angular velocity instruction value provided for the first gimbal 111 from when the moving object enters the correction range, to when it reaches the zenith is determined, based on the corrected angle $\theta_{need}$ and using the following equation:

$$\dot{\theta}'_{r1}=K\cdot\theta_{need} \text{ (from when the correction range is entered, to when the zenith is reached)} \tag{9}$$

where K is a corrected angular velocity gain.

Namely, until the moving object passes through the zenith, the angular velocity of the first gimbal 111 is controlled so that the difference between the azimuth axis angle of the first gimbal 111 and the moving direction of the moving object will approach zero.

When the AZ axis is driven by the corrected angular velocity instruction, and the zenith, where the EL axis assumes 90°, is reached, a tracking error inevitably occurs in the X component in accordance with a deviation of the moving object from the zenith. Therefore, correction driving for compensating for the tracking error is executed after the moving object passes through the zenith.

Correction driving for compensating for the tracking error is executed in the same manner as that based on the aforementioned mathematical expression (1). However, since near the zenith, the sec function has an extremely high value, a corrected angular velocity instruction based on a gain $K_p$ is generated for compensating for a tracking error in the zenith correction range, using the following equation:

$$\dot{\theta}'_{r1} = K_c \cdot K_p \cdot \Delta X \text{ (from when the zenith is reached, to when the correction range is left)} \quad (10)$$

After the EL axis exceeds 90° by the zenith correction and the moving object leaves the correction range, if the moving object again enters the correction range, the mathematical expression (9) is used, and the corrected AZ-axis angle $\theta_{need}$ needed in this case is given by $$\theta_{need} = \pi + \theta_{est} - \pi/2 - \theta_1 \text{ (from when the correction range is again entered after the correction range is left, to when the zenith is reached)} \quad (11)$$

Accordingly, when the moving object again enters the correction range after the EL axis assumes 90° or more and the moving object leaves the correction range, a zenith corrected angular velocity instruction given by the following equation is generated for tracking error compensation:

$$\dot{\theta}'_{r1} = K_c \cdot K_p \cdot \Delta X \text{ (from when the zenith is again reached after the correction range is left, to when the correction range is left)} \quad (12)$$

The angular velocity instruction selecting unit 172 uses the thus-determined angular velocity instruction value and corrected angular velocity instruction value, and the angles detected by the angle sensors 114, to select an angular velocity instruction value for the position near the zenith. When the moving object is outside the correction range, the angular velocity instruction selecting unit 172 uses, as the selected angular velocity instruction value, the following angular velocity instruction value (B) based on data indicating the detected tracking error and sent from the tracking error detecting unit 173. In contrast, when the moving object is within the correction range, the angular velocity instruction selecting unit 172 uses the following angular velocity instruction value (C) based on the aforementioned estimated moving object direction value. Regarding the second gimbal 121, the following angular velocity instruction value (D) is always used since no excessive angular velocity instruction is generated.

$$\dot{\theta}_{r1} \quad (B)$$

$$\dot{\theta}'_{r1} \quad (C)$$

$$\dot{\theta}_{r2} \quad (D)$$

Thus, the driving control unit 160 computes controlled instruction values that cause, zero, the differences between the respective angular velocity instruction values, generated by the angular velocity instruction selecting unit 172 for the first and second angular velocity sensors 113 and 123, and the angular velocities detected by the sensors 113 and 123. Based on the thus-computed instruction values, the gimbal driving unit is driven in order to track the moving object. The gimbal driving unit includes the first and second gimbals 111 and 121 and the first and second driving units 112 and 122.

By driving the moving object image tracking apparatus as described above, an excessive angular velocity instruction can be avoided even near the zenith, and hence appropriate angular velocity instructions for executing an appropriate tracking operation can be generated even near the zenith.

Referring then to FIG. 4, a description will be given of the field of view of the camera sensor 140 and tracking of a moving object.

FIG. 4 is a schematic view illustrating the field of view of the camera sensor and moving object tracking. When the moving object falls within the field of view of the camera, a detected tracking error ($\Delta X$, $\Delta Y$) as a deviation from the center of the field of view of the camera is obtained. In consideration of tracking delay, the detected tracking error must fall within the field of view of the camera. It is desirable that the detected tracking error be low. However, even if the detected tracking error is relatively high, the moving object can be tracked using the biaxial gimbal structure, as long as the value falls within the field of view of the camera.

Referring then to FIGS. 5, 6 and 7, a description will be given of a correction process executed when a moving object enters the zenith range, passes therein and leaves it.

FIG. 5 is a view illustrating the trajectory of the moving object, and that of the optical axis resulting from driving based on corrected angular velocities. If the optical axis is expressed three dimensionally, it can be oriented by the biaxial gimbal structure in every semispherical direction. Consideration will now be given to a typical example in which the moving object travels from the front of the tracking apparatus to the back of the same along a trajectory on the hemisphere slightly deviated from a trajectory that passes a maximum semi-circle of the hemisphere including the zenith. In FIG. 5, the range defined by the correction range threshold angle $\theta_{th}$ from the zenith is set as the correction range.

FIG. 6 is a view in which the correction range is enlarged two-dimensionally. FIGS. 6 and 7 show the trajectory of the moving object, the correction range and a tracking error in the gimbal zenith coordinate system. In this example, the moving object moves upwards. When the optical axis enters the correction range as a result of upwardly tracking the moving object using an angular velocity instruction based on a detected tracking error, the estimated moving object traveling angle $\theta_{est}$ becomes 90° in the gimbal zenith coordinate system. Accordingly, the angle of the AZ axis to be set until the zenith is reached is 0°, and the first gimbal 111 is driven by a corrected angular velocity instruction based on the mathematical expression (8). The second gimbal 121 is driven by an angular velocity instruction based on the tracking error detected by the tracking error detecting unit 173.

FIG. 7 is a view illustrating the positional relationship between the optical axis and the moving object, assumed when the optical axis reaches the zenith. At the zenith at which the EL axis assumes 90°, the traveling direction of the moving object is opposite to the aforementioned orientation in which the front position is assumed, and an X-directional tracking error $\Delta X$ corresponding to a deviation of the optical axis from the zenith occurs. To compensate for the tracking error, the first gimbal 111 is driven by a corrected angular velocity instruction based on the mathematical expression (9). The second gimbal 121 is driven by an angular velocity instruction based on the tracking error $\Delta Y$ that is detected by the tracking error detecting unit 173 based on the image acquired from the camera sensor 140. As a result, the tracking error is compensated for. Further, when the moving object leaves the zenith correction range, the corrected angular velocity instruction is switched to the angular velocity instruction based on the detected tracking error, thereby enabling continuous tracking.

Figure 8:
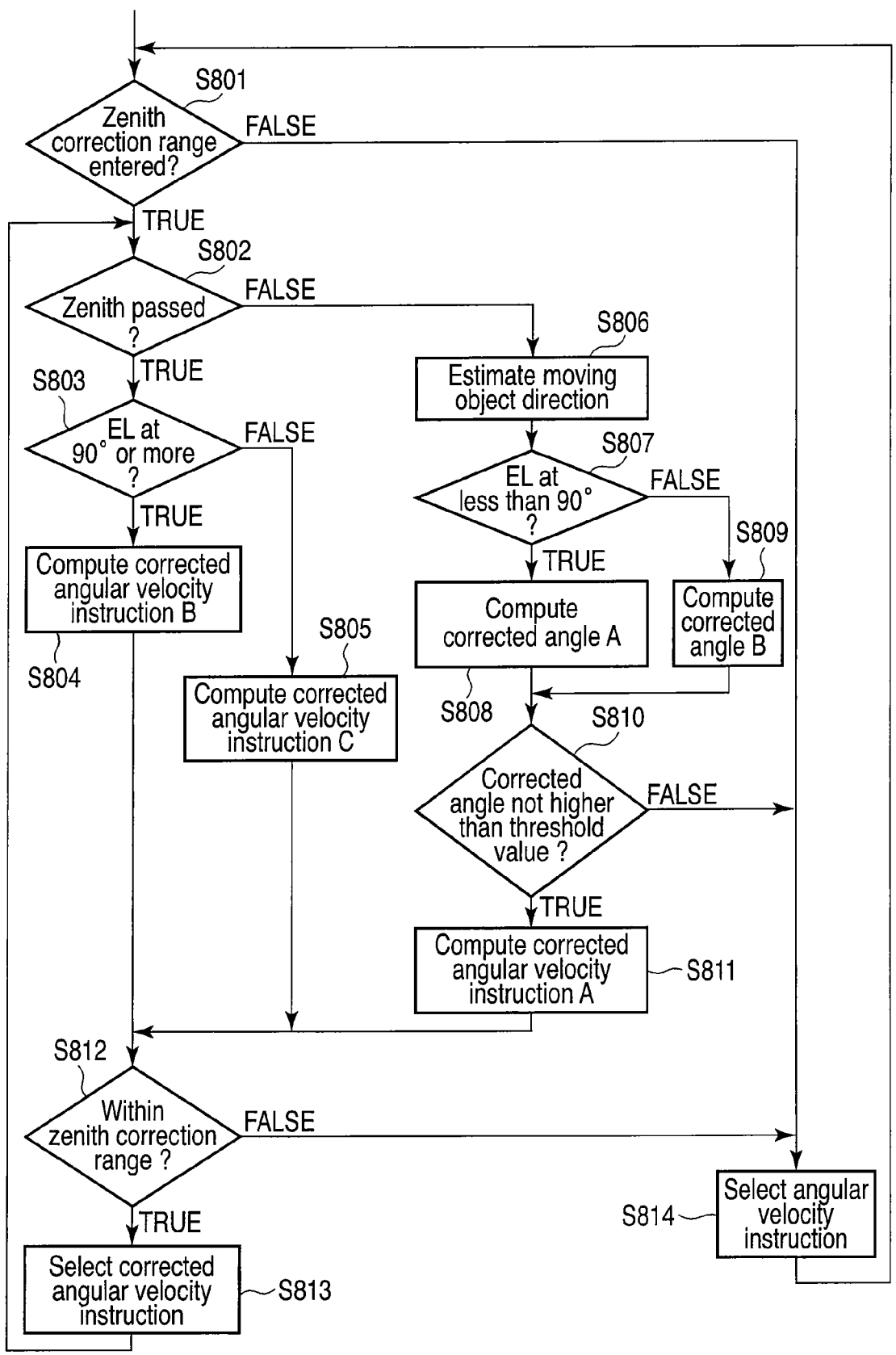
FIG. 8 is a view illustrating an operation example of the angular velocity instruction selection unit shown in FIG. 1.

Referring then to FIG. 8, an operation example of the angular velocity instruction selecting unit 172 will be described.

Firstly, it is determined whether a moving object enters the zenith correction range, using the gimbal angles detected by the angle sensors 114 and 124, and the mathematical expression (7) (step S801). If it is determined that the moving object is outside the zenith correction range, the angular velocity instruction value generated by the angular velocity instruction generating unit 150 is selected (step S814), and is transferred to the driving control unit 160. In contrast, if it is determined that the moving object has entered the correction range, it is determined whether the moving object has passed through the zenith, based on whether the EL axis has rotated through 90° (step S802). If the zenith is not reached, the moving object direction estimating unit 174 computes an estimated moving object direction value, based on the gimbal angles obtained from the angle sensors 114 and 124, and the tracking error obtained from the camera sensor 140 (step S806). If the angle of the EL axis does not exceed 90°, the corrected angle is computed as corrected angle A, using the mathematical expression (8) (step S808), while if the angle of the EL axis exceeds 90°, the corrected angle is computed as corrected angle B, using the mathematical expression (8) (step S809). If the thus-computed angle is greater than a corrected-angle threshold value, the angular velocity instruction value generated by the angular velocity instruction generating unit 150 is selected (steps S810 and S814). This enables application of correction to be limited even in the zenith correction range when the rotational angle of the first gimbal 111 is too large and therefore a high corrected angular velocity must be instructed. If the corrected angle for the first gimbal 111 is determined to be not higher than the threshold value, a corrected angular velocity instruction for instructing the corrected angular velocity A is generated using the mathematical expression (9) (step S811).

In contrast, after the moving object passes through the zenith, if the angle of the EL axis exceeds 90°, a corrected angular velocity instruction for instructing the corrected angular velocity B is generated using the mathematical expression (10) (step S804), while if the angle of the EL axis does not exceed 90°, a corrected angular velocity instruction for instructing a corrected angular velocity C is generated using the mathematical expression (11) (step S805).

Within the zenith correction range, the angular velocity instruction selecting unit 172 selects one of the computed corrected angular velocity instructions, and transfers the same to the driving control unit 160. While the gimbal structure is being driven by the corrected angular velocity instruction, it is repeatedly determined whether the moving object has passed through the zenith, computation of the corrected angular velocity instruction is switched. Further, while zenith correction is being executed, if it is determined that the moving object left the zenith correction range, the angular velocity instruction value generated by the angular velocity instruction generating unit 150 is selected, and then it is determined whether the moving object has again entered the zenith correction range.

Figure 9:
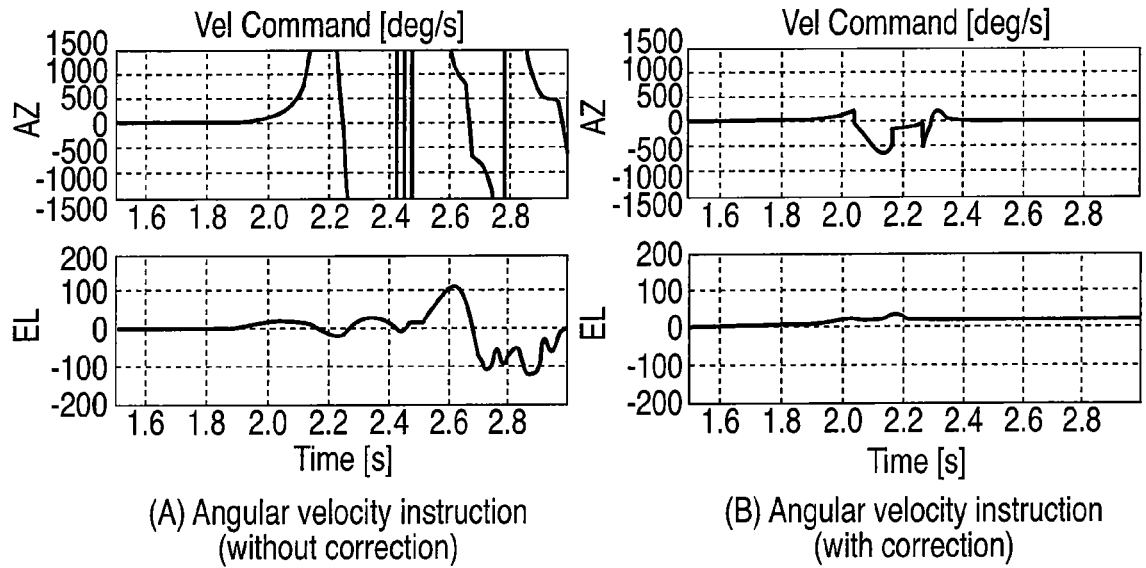
FIG. 9 is a view illustrating angular velocity instruction values that depend on whether correction control is executed in the moving object image tracking apparatus of FIG. 1.
Figure 10:
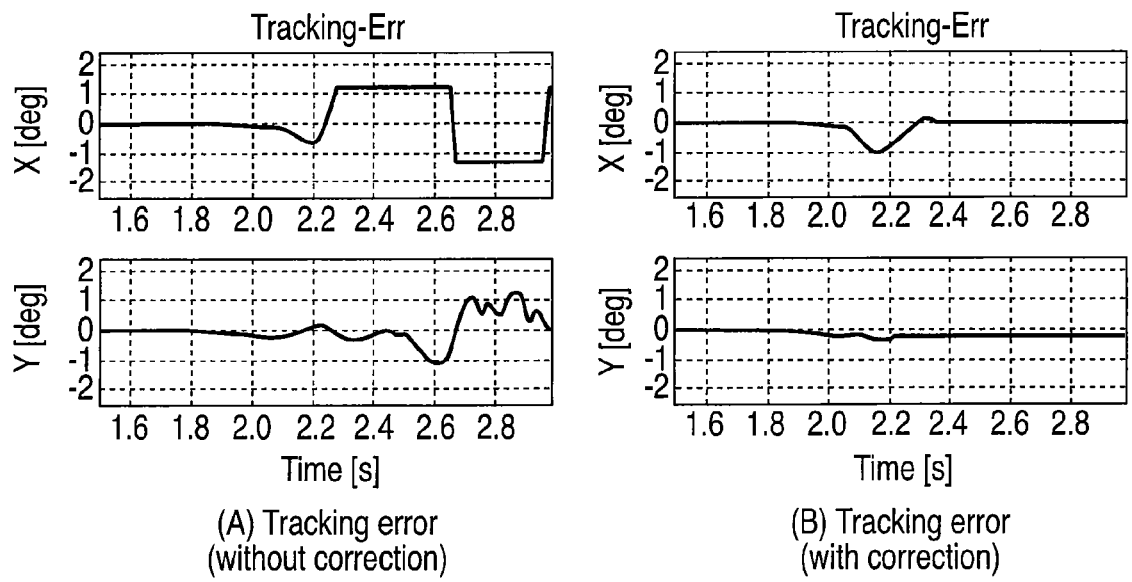
FIG. 10 is a view illustrating tracking errors that depend on whether correction control is executed in the moving object image tracking apparatus of FIG. 1.
Figure 11:
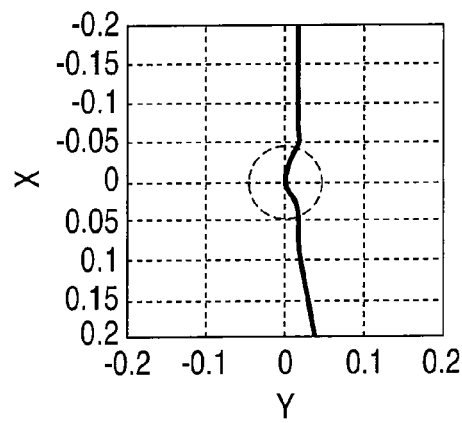
FIG. 11 is a view illustrating the trajectory of an optical axis vector in the gimbal zenith coordinate system, obtained when the correction control of the moving object image tracking apparatus shown in FIG. 1 is used.

Referring now to FIGS. 9, 10 and 11, a description will be given of variations in tracking error that occur depending upon whether correction control is executed by the moving object image tracking apparatus of the embodiment when the moving object travels from the front of the apparatus to the back along a trajectory slightly deviated from the zenith.

When the moving object slowly starts traveling and passes near the zenith, the closer to the zenith, the stronger the possibility of the gimbal structure horizontally greatly rotating the AZ axis from the front position at which the camera sensor faces the front, to thereby degrade the moving object tracking performance of the gimbal structure because of the limitations of the gimbal driving characteristics.

FIG. 9 shows the angular velocity instruction values imparted with time through the driving control unit 160 to the first and second gimbals 111 and 121. The first gimbal 111 corresponds to AZ, and the second gimbal 121 corresponds to EL. In the case (shown in FIG. 9(A)) where no correction is performed, an AZ-axis angular velocity instruction of an extremely high level is imparted near the zenith (near 2.2 [s] in the figure). However, this instruction cannot be followed because of the limitations of the gimbal driving characteristics. In contrast, in the case (shown in FIG. 9(B)) where correction is performed, angular velocity instructions are imparted which enable the gimbal driving characteristics to sufficiently track the moving object. The remarkable feature of the case shown in FIG. 9(B) where correction is performed near the zenith is that when the moving object has entered the correction range, the AZ axis starts to be rotated to counter the traveling direction of the moving object (for example, to be rotated clockwise in FIG. 2), and is therefore decelerated, with the result that the X-directional error ΔX due to zenith correction can be compensated for after passing through the zenith. Further, in the case of FIG. 9(B), the EL axis is driven at the angular velocity corresponding to the traveling speed of the moving object, and has its angle varied from 0 to 180° when tracking the moving object from the front to the back.

FIG. 10 shows variations with time in the x- and y-components of a camera tracking error obtained when no correction is performed, and those obtained when correction is performed. In the case (shown in FIG. 10(A)) where no correction is performed, an extremely large AZ-axis angular velocity instruction is generated, a large tracking error, which falls outside the tracking error detection range, occurs because of the limitations of the gimbal driving characteristics, whereby tracking becomes impossible. In contrast, in the case (shown in FIG. 10(B)) where correction is performed, the gimbal structure can reliably track the moving object within the tracking error detection range. The remarkable feature of the case shown in FIG. 10(B) is that the tracking error is maximum at a time, immediately before 2.2 [s], at which the moving object passes through the zenith, but falls within the field of view of the camera. This means that stable tracking can be executed.

FIG. 11 shows the vector trajectory of the optical axis in the gimbal zenith coordinate system, obtained when the correction is performed. The circle indicated by the broken line indicates the correction range. As shown in FIG. 11, the optical axis enters the correction range after upward tracking from below to thereby start zenith correction, then once orients toward the zenith having coordinates (0, 0), and then returns to upward tracking from below with occurrence of a tracking error suppressed.

The biaxial gimbal structure with no additional sensor, according to the first embodiment described above, has a movable range in which the second gimbal can be oriented from the front position to the back position, and hence can perform omnidirectional tracking. In this gimbal structure, at and near the zenith, an estimated moving object angular velocity is computed based on angle data, thereby executing driving in accordance with a corrected angular velocity instruction that corresponds to the estimated angular velocity. As a result, an appropriate angular velocity instruction for tracking a moving object, which is free from gimbal lock caused near the zenith by an excessive angular velocity instruction, can be generated, thereby improving the tracking performance.

Second Embodiment

In correction control performed in a moving object image tracking apparatus according to a second embodiment, the moving state of a moving object is determined using a moving object angular velocity estimated by a moving object angular velocity estimating unit 1201, and when tracking is started at the position extremely close to the zenith, angular velocity instructions are generated for the azimuth axis and the elevation axis so that the optical axis is oriented toward the zenith.

Figure 12:
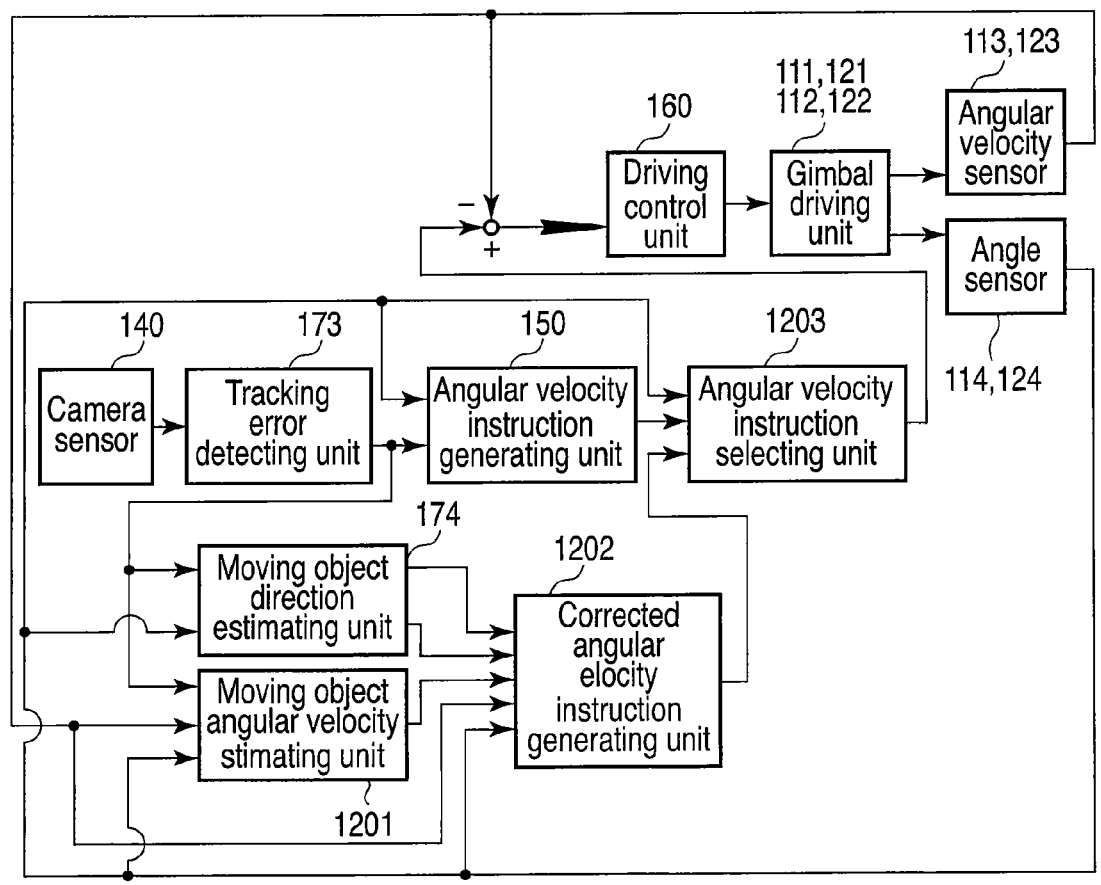
FIG. 12 is a block diagram illustrating a correction control system according to a second embodiment.

Referring to FIG. 12, a description will be given of the correction control system incorporated in the moving object image tracking apparatus of the second embodiment. FIG. 12 is a block diagram collectively illustrating the AZ axis and the EL axis.

The moving object angular velocity estimating unit 1201 receives data on a two-dimensional tracking error from the tracking error detecting unit 173, receives data on angles from the first and second angle sensors 114 and 124, and receives data on angular velocities from the first and second angular velocity sensors 113 and 123, thereby determining the velocity of the mobbing object.

In the correction control of the second embodiment, the moving object angular velocity estimating unit 1201 estimates the moving object velocity based on angle data indicating the angles of the gimbals, angular velocity data ($\omega_1$, $\omega_2$) indicating the angular velocities of the gimbals, and data ($\Delta X$, $\Delta Y$) indicating a detected tracking error sent from the camera sensor 140.

When the zenith correction is not applied, the moving object is always moving to cross the optical axis of the camera if it is tracked. At this time, since the vector velocity of the optical axis is equal to the velocity of the moving object, an estimated moving object angular velocity $\Omega_{est}$ is given by $$\omega_{est}=\sqrt{(\omega_1\cos\theta_2)^2+(\omega_2)^2} \qquad (13)$$

In contrast, when the zenith correction is applied, an operation for allowing a tracking error to avoid a high angular velocity instruction for the first gimbal 111 is executed. Therefore the velocity of the moving object cannot be estimated using the mathematical expression (13). In the zenith correction range, however, the X-directional tracking error is not related to the traveling of the moving object, and the velocity of the moving object is equal to the angular velocity instruction for the second gimbal 121. Accordingly, the velocity of the moving object is given by the following equation based on the Y-directional tracking error and a tracking gain $K_c$:

$$\omega_{est}=\sqrt{(K_c\Delta Y)^2} \qquad (14)$$

A corrected angular velocity generating unit 1202 generates a corrected angular velocity instruction based on the thus-determined estimated moving object the estimated moving object direction value $\omega_{est}$, the gimbal angles ($\theta_1$, $\theta_2$), and the gimbal angular velocities ($\omega_1$, $\omega_2$).

Figure 13:
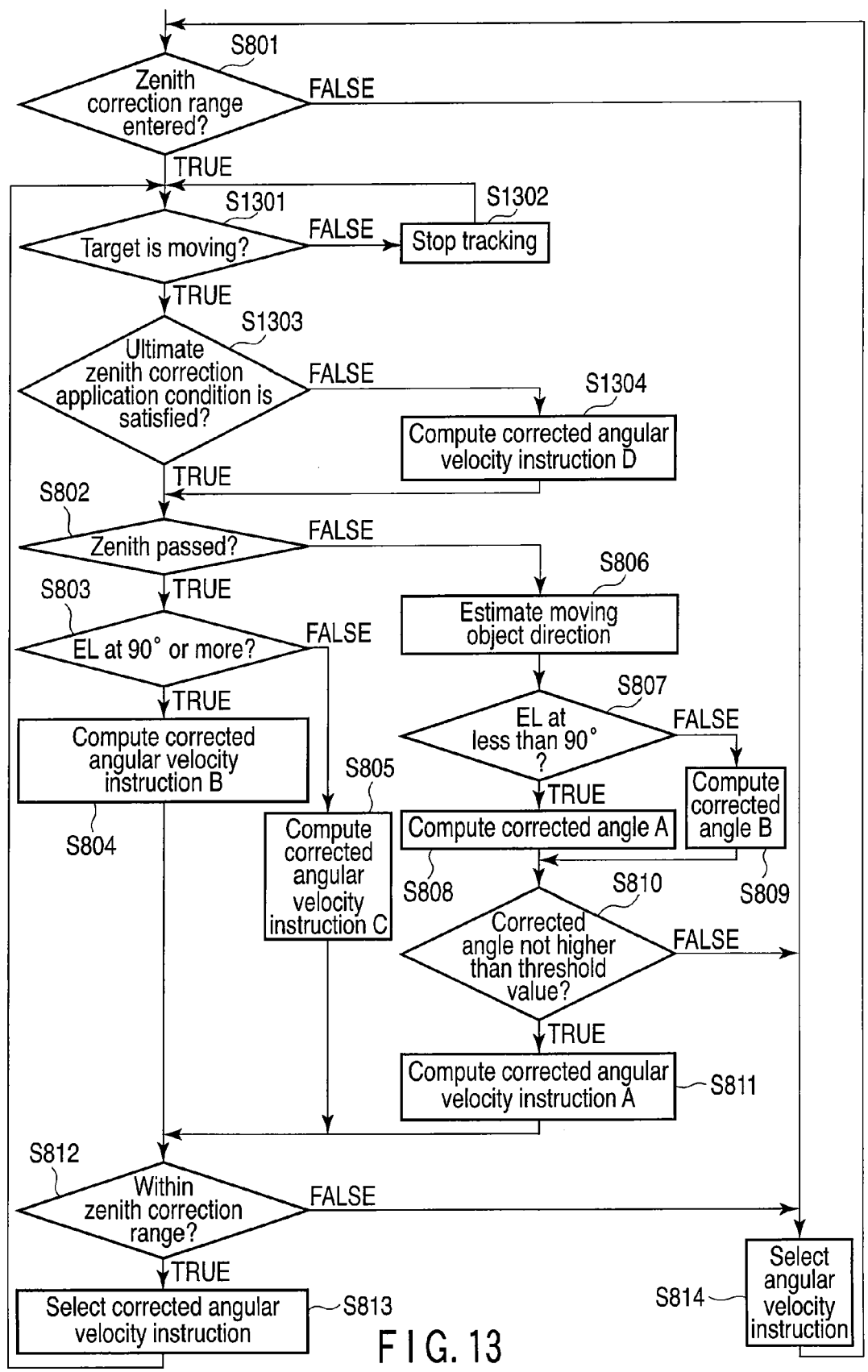
FIG. 13 is a flowchart illustrating an operation example of the angular velocity instruction selection unit shown in FIG. 12.

Referring then to FIG. 13, an operation example of an angular velocity instruction selecting unit 1203 will be described.

Firstly, if it is determined whether a moving object is in the zenith correction range (step S801), the traveling state of the moving object is determined based on the estimated moving object angular velocity $\omega_{est}$ estimated by the moving object angular velocity estimating unit 1201 (step S1301). If the estimated moving object angular velocity $\omega_{est}$ is higher than the moving object angular velocity threshold value $\omega_{th}$, it is determined that the moving object is kept to travel, and the program proceeds to step S1303. In contrast, if the estimated moving object angular velocity $\omega_{est}$ is not higher than the moving object angular velocity threshold value $\omega_{th}$, the gimbal structure is driven using an angular velocity instruction based on a tracking error and set for tracking performed when the moving object halts. However, near the zenith, sec $\theta_2$ has a very high value, and hence tracking to be performed when the moving object halts is performed using a sign function in place of a sec function (step S1302). A corrected angular velocity instruction generated when tracking is performed while the moving object halts is given by $$\dot{\theta}'_{r1}=K_c\cdot(-\text{sign}(\theta_2-\pi/2))\cdot\Delta X \qquad (15)$$

where sign $\theta$ is a signum function for outputting 1 when $\theta$ is higher than 0, outputting 0 when $\theta$ is equal to 0, and outputting $-1$ when $\theta$ is lower than 0.

If it is determined that the moving object is travelling, it is determined whether an ultimate zenith correction application condition related to a zenith singular point is satisfied (step S1303). The ultimate zenith correction application condition is defined by the following mathematical expression, based on whether tracking is started within the zenith correction range and whether the optical axis of the camera is within the range $\theta_c$ of the field of view. The range $\theta_c$ of the field of view is smaller than the zenith correction range.

$$|(\cos\theta_2\cdot\cos\theta_1)^2+(\cos\theta_2\cdot\sin\theta_1)^2|<(\sin\theta_c)^2 \qquad (16)$$

Namely, $|(\cos\theta_2)^2|<(\sin\theta_c)^2$

If the ultimate zenith correction application condition expressed by the mathematical expression (16) is not satisfied, the program proceeds to step S802, where the same zenith correction as in the first embodiment is executed. In contrast, if the ultimate zenith correction application condition, i.e., the mathematical expression (16), is satisfied, a corrected angular velocity instruction D is computed using the following equations (step S1304):

$$\dot{\theta}'_{r1}=K_c\cdot K_{p1}\cdot\Delta X \qquad (17)$$

$$\dot{\theta}'_{r2}=K_{p2}\cdot(\pi/2-\theta_2) \qquad (18)$$

If moving object tracking is started in the ultimate zenith range including the zenith singular point in accordance with the corrected angular velocity instruction D, the AZ axis is driven to reduce the tracking error, and the EL axis is driven to 90° that indicates the zenith, regardless of the tracking error. As a result, the EL axis is rotated to pass 90°. Therefore, in the subsequent zenith correction process, the same processing as in the first embodiment is executed. Namely, in the zenith correction range, the angular velocity instruction selecting unit 1203 selects the thus-computed corrected angular velocity instruction, and transfers it to the driving control unit 160. While driving is being executed in accordance with the corrected angular velocity instruction, it is repeatedly determined whether the EL axis has passed 90°, and computation of the corrected angular velocity instruction is switched. Further, in the zenith correction state, if it is determined that the optical axis is oriented outside the zenith correction range, the angular velocity instruction values generated by the angular velocity instruction generating unit 150 are selected (steps S801 and S814), thereby returning the program to the determination as to whether the optical axis is again oriented toward the zenith correction range.

In the above-described second embodiment, the traveling state of the moving object is determined using the moving object angular velocity estimated by the moving object angular velocity estimating unit, and when tracking is started at a position extremely close to the zenith, respective angular velocity instructions are generated for controlling the azimuth (AZ) axis and the elevation (EL) axis to orient the optical axis toward the zenith. As a result, gimbal lock near the zenith due to excessive angular velocity instructions can be avoided using appropriate angular velocity instructions, thereby improving the tracking performance.

Third Embodiment

In correction control executed by a moving object image tracking apparatus of a third embodiment, the traveling state of a moving object is determined using the difference in moving object position estimated by the moving object direction estimating unit 174, and when tracking is started at a position extremely close to the zenith, respective angular velocity instructions are generated for controlling the azimuth (AZ) axis and the elevation (EL) axis to orient the optical axis toward the zenith. The third embodiment differs from the second embodiment in the method of determining at step S1301 of FIG. 13 whether the moving object is traveling.

Referring to FIG. 14, a description will be given of a correction control system incorporated in the moving object image tracking apparatus of the third embodiment. FIG. 14 is a block diagram collectively illustrating the AZ and EL axes.

The condition for determining the traveling state of the moving object is given by the following mathematical expression based on the difference (dx, dy) in moving object position estimated by the moving object direction estimating unit 174 and expressed by the aforementioned equations (5). Namely, whether the moving object is traveling can be determined based on a difference at a certain sample interval which corresponds to the velocity of the moving object.

$$dx^2+dy^2<r^2 \tag{19}$$

If the difference is smaller than a threshold value, the moving object is determined to be in a halt, whereas if the difference is greater than the threshold value, the moving object is determined to be traveling. After that, the same zenith correction as in the second embodiment is executed.

The above-described third embodiment can provide the same advantage as that of the second embodiment by determining whether the moving object is traveling, based on the difference (dx, dy) in moving object position.

The moving object image tracking apparatuses of the above-described embodiments effectively serves as a tracking camera system of an omnidirectional biaxial gimbal structure installed in a mobile apparatus that is provided with, for example, a TV camera, camera seeker or automatic surveying tool.

As described above, even the biaxial gimbal structure can avoid, near the zenith, gimbal lock due to excessive angular velocity instruction values, and an appropriate angular velocity instruction for tracking a moving object can be generated to improve tracking characteristics, since the second gimbal has a movable range ranging from the front position to the back position, moving object velocity values are estimated based on angle data at and near the zenith, and the gimbal structure is driven by a corrected angular velocity instruction.

The present invention is not limited to the above-described embodiments, but may be modified in various ways without departing from the scope. Various inventions can be realized by appropriately combining the structural elements disclosed in the embodiments. For instance, some of the disclosed structural elements may be deleted. Some structural elements of different embodiments may be combined appropriately.

What is claimed is:

1. A moving object image tracking apparatus comprising:
a first rotation unit configured to rotate about an azimuth axis vertically oriented and rotatably supported;
a second rotation unit configured to rotate about an elevation axis rotatably supported and horizontally oriented, the elevation axis being perpendicular to the azimuth axis, the second rotation unit being horizontally rotatable from a front position at which the second rotation unit faces a front, to a back position at which the second rotation unit faces a back, via an angular position corresponding to a zenith, the second rotation unit having a movable range of at least 180°;
a driving unit configured to drive the first rotation unit and the second rotation unit to rotate independent of each other;
an acquisition unit supported by the second rotation unit and configured to acquire image data of a moving object by photography;
a first detection unit configured to detect, in the image data, a tracking error indicating a deviation of the moving object from a center of a field of view of the acquisition unit;
a second detection unit configured to detect angles indicating attitudes of the first rotation unit and the second rotation unit;
a third detection unit configured to detect angular velocities of the first rotation unit and the second rotation unit;
a first computation unit configured to compute first angular velocity instruction values for driving the first rotation unit and the second rotation unit to track the moving object, using the detected tracking error and the detected angles, when the moving object exists in a first range separate from the zenith by at least a preset distance;
an estimation unit configured to estimate a traveling direction of the moving object using the detected angles and the detected tracking error, when the moving object exists in a second range within the preset distance from the zenith;
a second computation unit configured to compute second angular velocity instruction values for driving the first rotation unit and the second rotation unit to track the moving object and avoid a zenith singular point, using the detected angles, the detected tracking error and the estimated traveling direction; and
a control unit configured to control the driving unit to eliminate differences between the first angular velocity instruction values and the angular velocities when the moving object exists in the first range, and to control the driving unit to eliminate differences between the second angular velocity instruction values and the angular velocities when the moving object exists in the second range.

2. The apparatus according to claim 1, wherein the estimation unit detects a position of the moving object in a zenith coordinate system, based on a positional component of an optical axis of the acquisition unit determined from the detected angles, and a positional component of the optical axis determined from the detected tracking error, and the estimation unit estimates a traveling direction of the moving object based on a difference between a currently detected position of the moving object and a position of the moving object detected a sampling interval before.

3. The apparatus according to claim 1, wherein until the moving object passes the zenith, the second computation unit controls a first angular velocity of the first rotation unit to cause a difference between an angle of the azimuth axis of the first rotation unit and the traveling direction to approach 0.

4. The apparatus according to claim 1, wherein after the moving object passes the zenith, the second computation unit controls a first angular velocity of the first rotation unit in accordance with the detected tracking error, to compensate for the detected tracking error.

5. The apparatus according to claim 1, further comprising a third computation unit configured to estimate an angular velocity of the moving object in accordance with the detected tracking error when the moving object exists in the second range, and wherein if the second computation unit starts to track the moving object in the second range, and if the optical axis falls within a certain range of the field of view, the second computation unit controls a first angular velocity of the first rotation unit to compensate for the detected tracking error, and controls a second angular velocity of the second rotation unit to cause the second rotation unit to orient the zenith.

6. The apparatus according to claim 5, wherein when the moving object exists in the first range, the third computation unit estimates the angular velocity of the moving object based on the angles detected by the second detection unit and the angular velocities detected by the third detection unit.

7. A moving object image tracking method comprising:
preparing a first rotation unit configured to rotate about an azimuth axis vertically oriented and rotatably supported;
preparing a second rotation unit configured to rotate about an elevation axis rotatably supported and horizontally oriented, the elevation axis being perpendicular to the azimuth axis, the second rotation unit being horizontally rotatable from a front position at which the second rotation unit faces a front, to a back position at which the second rotation unit faces a back, via an angular position corresponding to a zenith, the second rotation unit having a movable range of at least 180°;
driving the first rotation unit and the second rotation unit to rotate independent of each other;
preparing an acquisition unit supported by the second rotation unit, and acquiring image data of a moving object by photography;
detecting, in the image data, a tracking error indicating a deviation of the moving object from a center of a field of view of the acquisition unit;
detecting angles indicating attitudes of the first rotation unit and the second rotation unit;
detecting angular velocities of the first rotation unit and the second rotation unit;
computing first angular velocity instruction values for driving the first rotation unit and the second rotation unit to track the moving object, using the detected tracking error and the detected angles, when the moving object exists in a first range separate from a zenith by at least a preset distance;
estimating a traveling direction of the moving object using the detected angles and the detected tracking error, when the moving object exists in a second range within the preset distance from the zenith;
computing second angular velocity instruction values for driving the first rotation unit and the second rotation unit to track the moving object and avoid a zenith singular point, using the detected angles, the detected tracking error and the estimated traveling direction; and
controlling the first rotation unit and the second rotation unit to eliminate differences between the first angular velocity instruction values and the angular velocities when the moving object exists in the first, range, and controlling the first rotation unit and the second rotation unit to eliminate differences between the second angular velocity instruction values and the angular velocities when the moving object exists in the second range.

* * * * *